United States Patent [19]
Lundren et al.

[11] Patent Number: 5,869,757
[45] Date of Patent: Feb. 9, 1999

[54] APPARATUS FOR VOLUME DETERMINATION

[75] Inventors: Christer Lundren, Vellinae; Bengt I. Larsson, Skivcur, both of Sweden

[73] Assignee: Dresser Industries, Inc., Dallas, Tex.

[21] Appl. No.: 964,380

[22] Filed: Nov. 6, 1997

[30] Foreign Application Priority Data

Jul. 11, 1996 [SE] Sweden .................................. 9604076-1

[51] Int. Cl.$^6$ ........................................................ G01F 7/00
[52] U.S. Cl. ................................................................ 73/195
[58] Field of Search ................................ 73/866.1, 866.3, 73/431, 195, 198, 201, 239, 273; 222/25–27; 324/227, 207.25

[56] References Cited

U.S. PATENT DOCUMENTS

| | | |
|---|---|---|
| 2,936,096 | 5/1960 | Shawhan . |
| 4,265,127 | 5/1981 | Onoda . |
| 5,146,782 | 9/1992 | Rasmussen .................. 73/273 |
| 5,509,305 | 4/1996 | Husain et al. ................ 73/195 |
| 5,540,107 | 7/1996 | Silverman et al. . |
| 5,557,084 | 9/1996 | Myers et al. . |

FOREIGN PATENT DOCUMENTS

PCT/SE88/ 08518 4/1988 WIPO .

*Primary Examiner*—Robert Raevis
*Attorney, Agent, or Firm*—Haynes and Boone, L.L.P.

[57] ABSTRACT

An apparatus for volume determination in a pump unit for fluid, such as fuel, in which a first and a second metering means are provided which are juxtaposed. The metering means each comprise a metering casing having a shaft assembly, which is adapted to be rotated when fluid flows through the metering casing. Each metering means further comprises a pulse generating means, which has a frequency generator and a pulse generator and which is adapted to convert the rotation of the shaft assembly into pulses. The frequency generator is connected to the shaft assembly for rotation therewith, mounted in the respective metering casings. The two pulse generators are adapted to sense, in a contactless manner, rotation of the respective frequency generators and to emit pulses in relation thereto. The two pulse generators are arranged in a separate pulse generator module and are encompassed in a pulse generator casing, which is detachably connected to the metering casing. The invention is also directed to a separate pulse generator module.

10 Claims, 2 Drawing Sheets

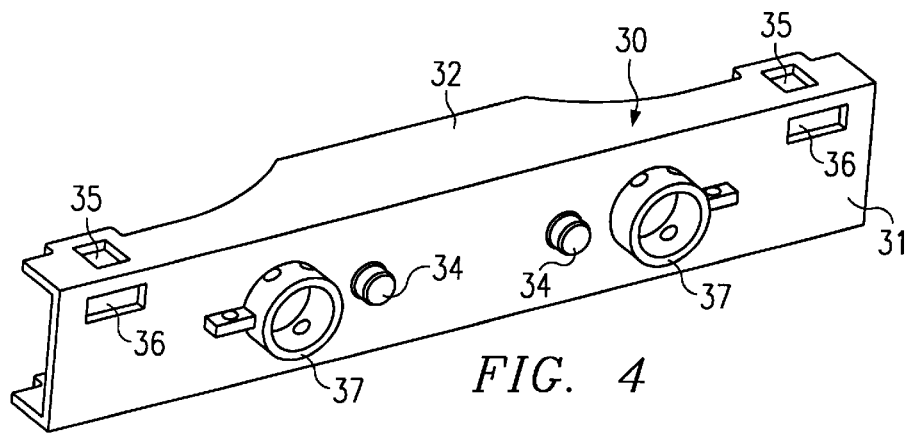
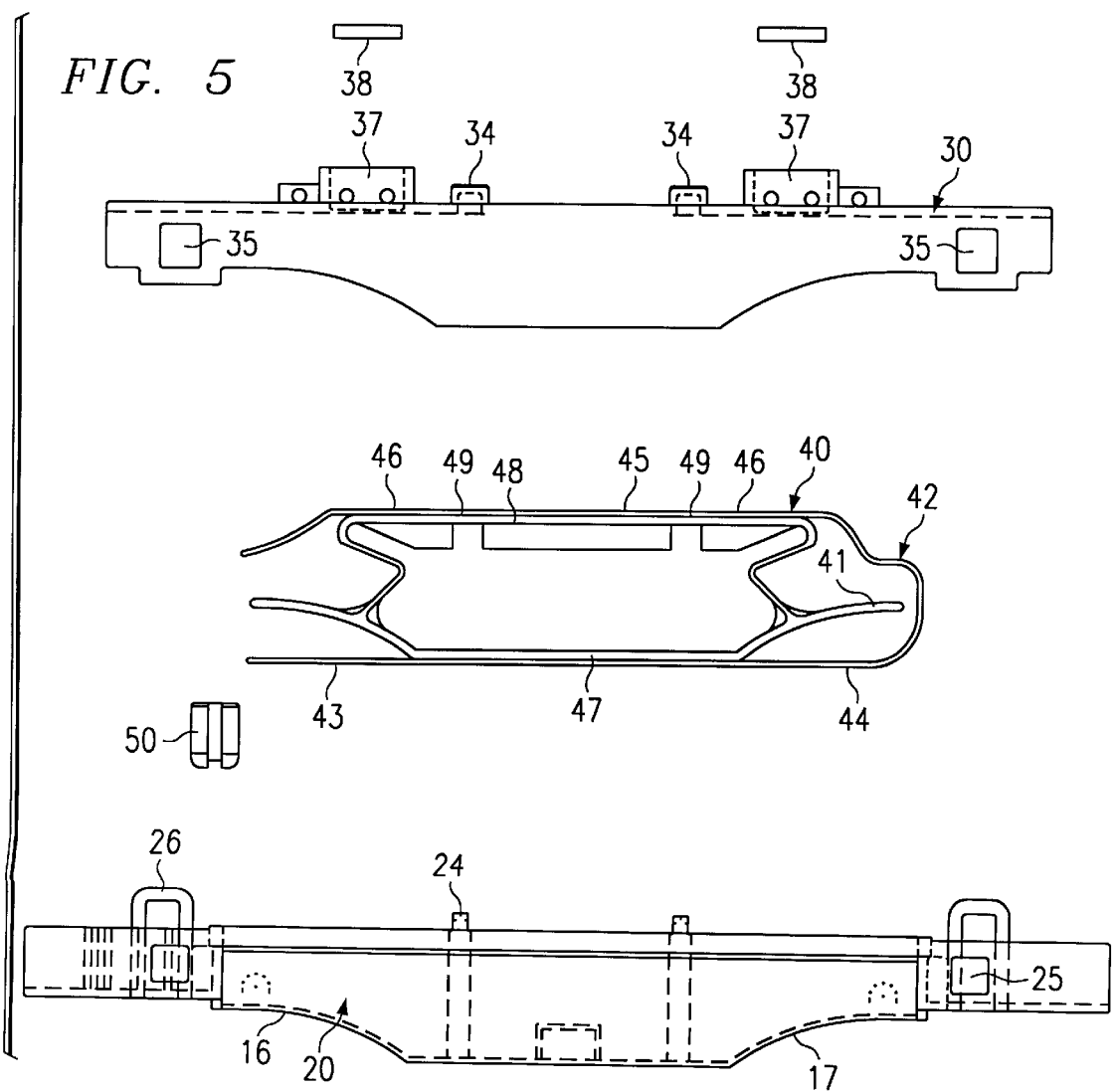

APPARATUS FOR VOLUME DETERMINATION

BACKGROUND OF THE INVENTION

The present invention relates to an apparatus for determining the volume of liquid, such as fuel, dispensed from a pump, as well as a pulse generator module for such an apparatus.

DESCRIPTION OF THE PRIOR ART

When measuring the volume of fuel dispensed from a pump for pumping a fluid, such as fuel, it is common to let the fuel flow through a metering means, in which the fluid flow, via movable pistons in a measuring chamber in the metering means, causes a rotational movement. the rotational movement is then converted by a pulse generator, which emits electric pulses at a frequency which is proportional to the speed of the rotational movement. By means of these pulses, a calculating unit then controls a counter to indicate the volume dispensed.

An example of an apparatus of this kind for measuring the volume of a flowing fluid is disclosed in Applicant's WO 88/08518. In this apparatus, the movable pistons in the measuring chamber are connected to a rotatable shaft assembly. When the fluid flows through the measuring member, the pistons are caused to move and the shaft assembly is rotated. To the shaft assembly there is connected a pulse generating means comprising a frequency generator in the form of a disk which is adapted to rotate with the shaft assembly, and a pulse generator which is adapted to sense, in a contactless manner, the movement of the frequency generator and convert it into pulses via an optical transmitter and an optical receiver. By means of this apparatus, pulses are generated, the number of which corresponds to the volume that has passed through the measuring chamber. The pulse generator, in turn, is connected to a calculating unit for calculating the volume that has flown through the measuring chamber depending on the number of pulses emitted by the pulse generator. To the calculating unit there is, in turn, connected a counter for indicating the dispensed volume.

In this construction, the entire metering means, including its pulse generating means, is arranged in a common casing. The measuring chamber is separated by a partition from the pulse generating means located in a pulse generating chamber, and the frequency generator is adapted to follow the movement of the shaft assembly through a strong magnetic coupling acting transversely of the partition. The construction disclosed in WO 88/08518 represents in itself an essential improvement compared with constructions which are available on the market and in which the frequency generator is connected directly to the shaft assembly via a shaft opening in the partition.

As a rule, all equipment for handling vehicle fuels must be especially adapted to operate in an environment containing volatile and inflammable fluids. Every risk of explosion or ignition must be avoided, since the consequences, for instance at a gas station where large amounts of fuel are stored, can be disastrous.

These are various methods for avoiding the risk of explosion. According to one method, use is made of such low energy levels that there is no risk of sparking. This is guaranteed by one or more explosion protection units, which constitute an explosion barrier and take care that no electricity on a safe side of the barrier has too high a level of energy. Components and wires connected on the safe side of such an explosion barrier are called intrinsically safe. The more components and the more energy-requiring components that are made intrinsically safe, the higher demands are placed on the barrier. As an example, it may be mentioned that the apparatus for optical transmission and reception between a frequency generator and a pulse generator has a requirement of energy which is great in the context.

According to a further method, the source of electrical energy can be isolated from the fuel, or fuel vapors, by encapsulating electric conductors and components. Each unit containing electronics must be insulated from both flowing fuel and surrounding fuel vapors, if any, which in turn results in high costs. There are particular difficulties in the sealing round lead-ins in casings and partitions, e.g. for electric wires. There are still greater difficulties when sealing shaft openings for rotatable shafts.

In the construction according to WO 88/08518, these difficulties have been eliminated by the partition having double partition panels and a contactless transmission of movement by means of a strong magnetic coupling being arranged transversely of one partition panel.

Although this construction has been found reliable, the partition construction, which comprises a chamber projecting towards the measuring chamber and holding a magnet, and a shaft unit having two bearings, is relatively complicated to manufacture. The entire magnetic coupling between the shaft assembly and the pulse generating means requires space and the use of relatively strong magnets for a reliable transmission of movement transversely of the partition panel. Moreover, the pulse generating chamber must be sealed by means of seals both towards the measuring chamber and outwards towards the surroundings in the fuel pump unit.

It is common at gas stations to interconnect different fuel qualities in common pump units, for instance in such manner that gas having an optional octane rating can be obtained from the same dispenser, or in such manner that the same gas quality can be filled up from two different dispensers belonging to the same pump unit. To this end, it is usual to arrange two metering means, each comprising a pulse generating means, for the same pump unit. When two metering means of the above-mentioned type and their associated pulse generating means are mounted in the same pump unit, several cables are required, at the same time as several components in a common danger area must be made explosion-proof, which renders maintenance and satisfactory explosion-proofness difficult.

In pump units for fuel it is desirable, in addition to the possibility of reading the dispensed volume for each filling operation, to have the possibility of reading the totally dispensed volume for each pump unit for checking the volumes sold and also reading the totally dispensed volume for each metering means for checking calibration and maintenance intervals. Today electronic total counters for the total volume sold are available, intended to be connected in pump units. These do not follow the respective metering means. Therefore, there is no information on the total volume dispensed from a separate metering means. Today, also special mechanical total counters are available for connection to the respective metering means. These mechanical counters follow the metering means and produce total volume data for the metering means specifically, independently of in which pump unit it is mounted. These mechanical counters are further subjected to wear. There will be particularly heavy wear if the counter is arranged at a distance from the metering means and if one transmits a rotational movement thereto, for instance through a wire, which is desirable in order to facilitate reading.

A further inconvenience in the metering means that are available on the market today is fuel thefts, which can be committed by removing the pulse generator from the rest of the metering means. The pulse generator then cannot sense any movement and thus emits no pulses. To prevent the pulse generator from being removed, use is made of mechanical antitheft devices, e.g. padlocks. According to another technique, the pulse generator is mounted by means of bolts, whose head is broken off after mounting, which means that the pulse generator, when being removed, must be broken away from the rest of the metering means. Consequently, also the authorized staff must break away the pulse generator when maintenance is required, which, of course, renders maintenance difficult.

SUMMARY OF THE INVENTION

One object of the invention is to eliminate or reduce the above-described drawbacks in the determining of the volume of fluid being dispensed from a fluid pump unit.

A further object is to reduce the costs associated with explosion protection in connection with apparatus for measuring the volume of fuel, at the same time as equivalent or improved explosion protection is provided.

A special object is to simplify the maintenance and the mounting of liquid metering means.

In the invention, the designation "pulse generating means" designates a means for converting movement into pulses. On the other hand, "pulse generator" concerns an apparatus which has the capacity of converting some sort of signals of a first frequency into pulses of the same frequency, or of a frequency into pulses of the same frequency, or of a frequency corresponding to said first frequency. Thus, a pulse generator is included as part of a pulse generating means. The designation "frequency generator" concerns a means for periodic movement, the frequency of the movement being detectable in some way.

According to the invention, two metering means are arranged adjacent to each other. For generating pulses, each metering means has a frequency generator. The frequency generator is mounted in the metering casing, either in the metering casing of the respective metering means or in a metering casing common to both metering means.

A separate pulse generator module contains two pulse generators. The pulse generators are each connected to a frequency generator and are arranged to sense its movement in a contactless manner. the pulse generator module is encompassed in a separate pulse generator casing.

By mounting two metering means together and letting the frequency generator of each metering means be mounted in the casing of the metering means at the same time as the pulse generators are arranged in a module of their own, an advantageous module system with exchangeable units is formed.

By gathering two pulse generators in a module, manufacture as well as maintenance can be made simpler and, thus, less expensive. As an example, it may be mentioned that in case of an error in the pulse generator module, it is possible to simply exchange the entire module and thus quickly restore the pump unit for operation. The defect module may then be taken care of separately.

Since the pulse generator is adapted to sense in a contactless manner the movement of the frequency generator and, besides, is positioned in a separate casing, a division is rendered possible, in which moving parts and electronics are enclosed in separate casings.

Moreover, it will be easier to make an inventive apparatus for determining a fuel volume explosion-proof, since the pulse generators are enclosed in a module of their own, which in itself allows a simplified explosion protection, and because two pulse generators are encompassed in the same separate casing, a common explosion protection can be provided, thereby almost halving the total cost for explosion protection. Further, it is of course safer to have a single explosion protection than to have a plurality of separate explosion protections for separate units.

In a preferred embodiment of the invention, the frequency generators are encompassed in a measuring chamber, through which fuel flows, in the respective measuring casings. This eliminates the need of accomplishing a transmission of movement transversely of a tight partition. It is thus possible to simplify the design of the metering means on the pulse generator side. At the same time a tight closure of the metering casing on the pulse generator side is guaranteed in a simple manner. Furthermore, the transmission of movement between the shaft assembly of the metering means and the frequency generator is simplified.

This preferred embodiment may also be considered as if the tight barrier between the pulse generating means and the measuring chamber has been moved from being positioned between the measuring chamber and the frequency generator to being positioned between the frequency generator and the pulse generator of the pulse generating means.

An advantage of moving the tight barrier to be positioned between the frequency generator and the pulse generator is that it is easier to transmit in a contactless manner signals transversely of a tight barrier as compared with contactless transmission of movement transversely of a barrier.

In a further preferred embodiment of the invention, the pulse generator module comprises a processor unit which is common to both pulse generators. This means that the cost of the pulse generator function can be reduced while saving space. The pulse generator module can accommodate a total counter function for metering means as well as pump unit, in which case the respective total counters can easily be shown on the usual counter of the pump unit.

In a further preferred embodiment, the module comprises a calibratable correction unit, and therefore correction of the number of pulses corresponding to a certain volume can be effected directly in the pulse generator module.

In a particularly preferred embodiment, the frequency generators comprise magnets, which cause magnetic field changes when the frequency generators rotate. According to this embodiment, the pulse generators are adapted to convert the magnetic field changes into electric pulses.

A great advantage of this embodiment is that the pulse generators sense magnetic field changes of another type when they are removed from the frequency generators. Thus, it is possible to register that the pulse generators are being removed, and therefore to interrupt or prevent the dispensing of the fluid. It will thus be impossible to steal the fluid by removing the pulse generators from the frequency generators. Also the need of complicated mechanical antitheft devices is obviated.

One more advantage of magnetic communication between frequency generator and pulse generator is that only low electric energy levels are required for operation of the pulse generators. This results in lower demands being placed on an explosion barrier to make the pulse generators intrinsically safe, which in turn results in cost savings.

BRIEF DESCRIPTION OF THE DRAWINGS

The invention will now be described in more detail with reference to the accompanying drawings, which illustrate a non-limiting embodiment, and in which

FIG. 4 is a perspective view of a second part of a pulse generator casing according to the invention; and FIG. 5 is an exploded side view of a pulse generator module according to the invention and shows the components included therein.

DETAILED DESCRIPTION OF THE PREFERRED EMBODIMENT

Figure 1:
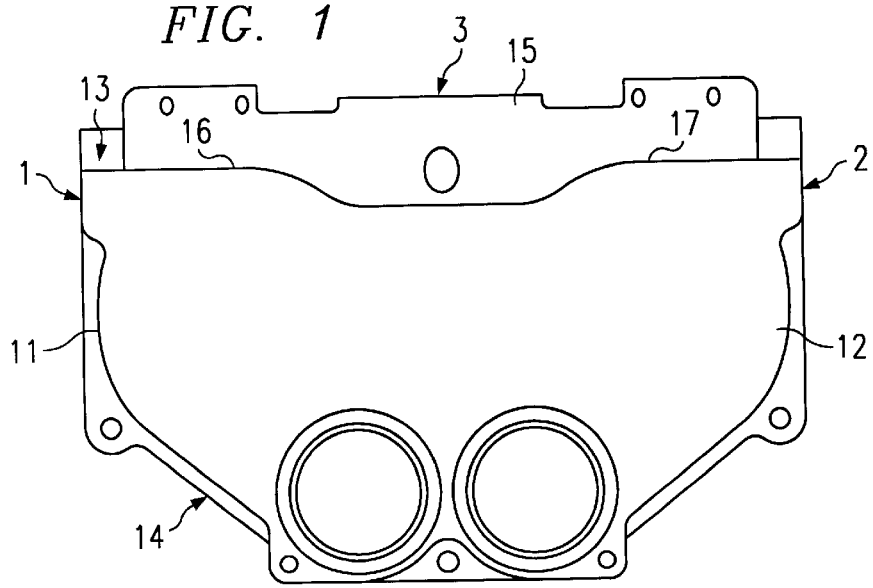
FIG. 1 is a side view of an apparatus for volume determination in a fluid pump unit according to the invention.

Referring to FIG. 1, two metering means 1 and 2 are shown, whose metering casings 11 and 12 are assembled in a common casing 14. Each of the metering means has a measuring chamber of its own with movable pistons which are connected to a shaft assembly. When a fluid, such as fuel, flows through the measuring chamber through inlet ducts and outlet ducts (not shown), the pistons are moved and the shaft assembly is rotated. A frequency generator is connected to each shaft assembly for rotation therewith in the metering casing. The frequency generator is formed as a disk having a number of magnets around its periphery. The frequency generators are mounted on the respective shaft assemblies and arranged in the respective measuring chambers, i.e. in contact with the fuel.

A pulse generator module 3 according to the invention is connected to the casing 14. The pulse generator module 3 is enclosed in a pulse generator casing 13 of plastic and has two connection points 16 and 17 adjacent to the pulse generators 43 and 44 for connection to the casing 14 adjacent to the frequency generators. The pulse generator casing has a metal cover 15 for preventing direct contact between the pulse generator casing 13 and the casing 14.

The pulse generators are adapted to convert magnetic field changes which arise as the frequency generators rotate. It is important that the pulse generators are mounted in the vicinity of the frequency generators. It has been found very convenient to use magnets and hall effect sensors for contactless transmission of frequency signals between a frequency generator and a pulse generator.

It has been found advantageous to arrange four hall effect sensors after each other, such that each electromagnetic field change results in four successive pulses. As a result, a high resolution of each revolution is obtained for the frequency generator. For instance, 104 pulses can be obtained per revolution with 26 magnets arranged on the circumference of the frequency generator. The size of the frequency generator can thus be limited, which is a great advantage. One more advantage of four successive measurements is that the difficulties in steeling fuel by cheating the pulse generator will increase.

In this embodiment, all movable components are arranged in the metering casing and all electronics that must be made explosion-proof are arranged in the pulse generator module. The pulse generator module shown in the embodiment is intended to have intrinsically safe electronics.

A preferred embodiment of a pulse generator module will be described below with reference to FIGS. 2–5.

Figure 2:
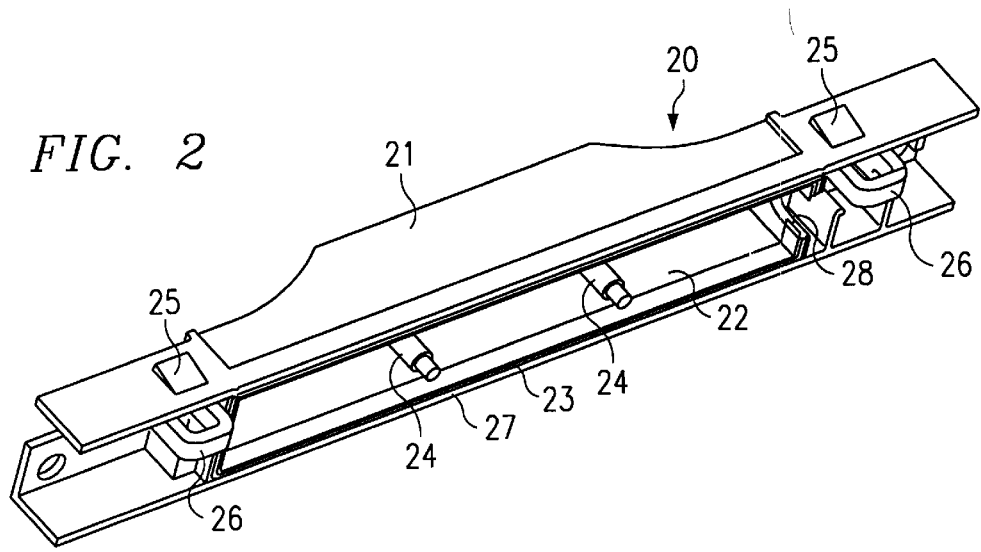
FIG. 2 is a perspective view of a first part of a pulse generator casing according to the invention.

FIG. 2 illustrates a case 20 which constitutes a first part of a pulse generator casing 13. The case 20 has an inside and an outside, of which the inside is shown. The case 20 comprises a covering 21, preferably of plastic, and an elongate chamber 22 formed of the covering 21. The chamber 22 has on the inside of the case 20 an opening directed from the covering 21, and the opening is partly surrounded by a flat surface 23 for a seal 27.

The case 20 comprises engaging means in the form of pins 24, which are arranged in the chamber 22 on the inside of the covering 21 and extend through the opening of the chamber 22, projections 25 on the outside of the covering 21, and curved members 26, which, on the inside of the covering 21 adjacent to the projections 25 outside the chamber, extend in parallel with the pins 24.

On one short side of the chamber 22 there is formed a lead-in 28 for an electric cable.

Figure 3:
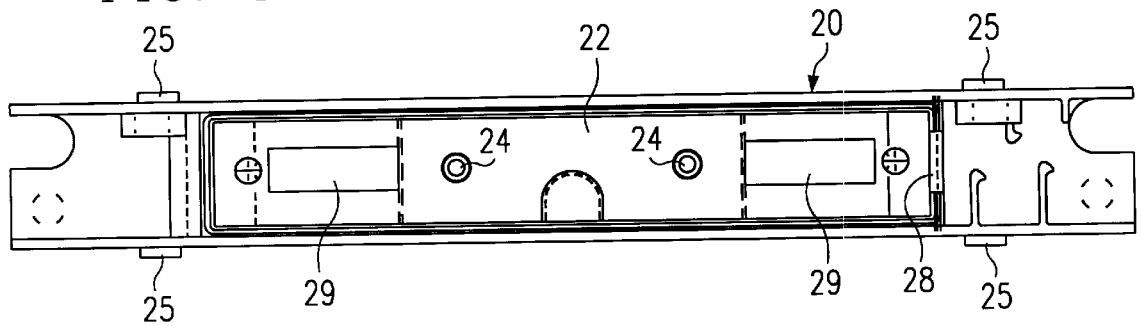
FIG. 3 is a top plan view of the inside of the part shown in FIG. 2.

FIG. 3 is a plan view of the inside of the part illustrated in FIG. 2. Like parts have been given the same reference numerals. In addition to that shown in FIG. 2, two recesses 29 are to be seen, which are formed of two portions where the covering is thinner. The two recesses 29 are each adapted to receive a pulse generator unit of a printed circuit. By the material of the covering being thinner adjacent to the pulse generator units, the possibility of the pulse generators sensing in a contactless manner through the material is promoted.

FIG. 4 illustrates a cover 30, which constitutes a second part of a pulse generator casing according to the invention and which fits the case 20. The side of the case 20 shown in FIG. 2 is adapted to fit the side of the cover 30, which is not shown in FIG. 3, i.e. the inside of the cover 30.

The cover 30 has a plate portion 31, whose not shown side is adapted to engage the flat surface 23 and the seal 27 surrounding the chamber 22 in the case 20. Side portions 23 extend along the long sides of the plate portion 31, perpendicularly thereto.

The cover 30 comprises engaging means, in the form of apertures 35, 36, matching and engaging means 25, 26. There are also engaging means for the pins 24 on the not shown inside of the cover 30.

On the outside of the cover 30, there are two annular holders 37 for switching means (not shown) in the form of magnets. Their function will be described in more detail below.

FIG. 5 depicts the components of a pulse generator module 3 according the invention, separated from each other. The pulse generator module 3 comprises a case 20, a printed circuit assembly 40 which is adapted to be mounted in the chamber 22, a cover 30 and a seal 50. Moreover, two magnets 38 belonging to the cover are shown.

The pulse generator module is mounted by inserting the printed circuit assembly 40 into the chamber 22 of the case 20. A cable (not shown) is connected to the printed circuit assembly 40 and is passed through the seal 50, which is arranged in the lead-in 28 formed in the chamber 22. Subsequently, the cover 30 is pressed against the case 20, whereby the engaging means 24, 25, 26 of the case 20 engage the corresponding engaging means 34, 35, 36 of the cover 30. Thus, a tight and explosion-proof pulse generator module is formed.

The printed circuit assembly 40 comprises a holder 41 which holds and supports a printed circuit 42. The holder has a case side 47 and a cover side 48 and is resilient therebetween. In the cover side 48 of the printed circuit holder there are two apertures 49 for receiving the ends of the pins 24. The ends of the pins 24 preferably have a reduced diameter. The cover side 48 of the printed circuit holder rests against a shoulder in the transition between the different diameters of the pins.

The printed circuit 42, which can be a flexible card, is thin and comprises two pulse generators 43 and 44, each comprising four hall effect generators which are adapted to successively register frequency signals in the form of changes in the magnetic field from a frequency generator. The printed circuit 42 further comprises a processor unit 45 which is connected to the two pulse generators 43, 44 and common thereto and which is positioned on the side of the printed circuit facing the cover 30. The processor unit has a calibration function, which will be described in more detail below, and a theft-detecting function, which gives a signal to a pump computer when detecting impermissible magnetic filed changes, for instance when removing the pulse generator module from the frequency generator of metering means. Also, information on the total volume dispensed through each of the metering means is stored in a memory unit on the printed circuit.

Adjacent to the processor unit 45 there are two switching units 46, which are adapted to sense the presence or absence of the switching means, i.e. the magnets 38, in the holders 37.

The processor unit 45 accommodates a calibratable correction unit. When the switching units 46 sense the presence of the magnets 38, the pulse generator unit functions to emit pulses via the cable (not shown) in response to movement of a frequency generator which is connected to one of the pulse generators. When the switching units 46 sense the absence of magnets 38, the processor unit 45 is put into calibration mode. In this mode, the correction unit will be calibrated for adaptation of the number of pulses which are to be emitted in relation to a given volume that has passed. After completion of the calibration, the magnets 38 are again placed in the holders 37. The position of the magnets 38 in the holders 37 is sealable, which makes the calibration function convenient in commercial plants, in which the accuracy of the meters is checked regularly. A great advantage of using magnets for calibration signals is that signals are given in a contactless manner to the switching units and that no lead-in is required in the pulse generator casing.

Since the chamber 22 has only one lead-in 28, it will be easier and less expensive to accomplish explosion protection by encapsulation, especially if two pulse generators are arranged to communicate via the same lead-in. Preferably, the lines of the pulse generator module are laid in a common cable, and a seal is arranged in the lead-in round the cable.

Pulse generator modules of the type described above can, with intrinsically safe electronics and the described hall effect sensors, advantageously be connected in series. For instance, five pulse generator modules can be connected to a common barrier for explosion protection via a common serial bus.

The invention is not limited to the embodiment described above, but several modifications are feasible within the scope of protection according to the accompanying claims.

The frequency generators and the pulse generators thus need not be arranged to communicate via magnetic fields, but they can communicate, for instance, in an acoustic, optical or inductive manner.

The frequency generators can be arranged in the casing outside the measuring chamber and thus have no direct contact with the fuel.

It is understood that the present invention is not limited to the pumping of fuel but is equally applicable to the pumping of any liquid.

What is claimed is:

1. An apparatus for volume determination in a fluid pump unit, said apparatus comprising:

a first metering means comprising:
   a metering casing having a shaft assembly, which is enclosed therein and which is adapted to be rotated when fuel flows through the metering casing, and
   a pulse generating means which is adapted to convert the rotation of the shaft assembly into pulses and which comprises a frequency generator and a pulse generator, the frequency generator being connected to the shaft assembly to be rotated therewith, and the pulse generator being adapted to sense, in a contactless manner, rotation of the frequency generator and to emit pulses in relation thereto, a second metering means comprising:
   a metering casing having a shaft assembly, which is enclosed therein and which is adapted to be rotated when fluid flows through the metering casing, and
   a pulse generating means which is adapted to convert the rotation of the shaft assembly into pulses and which comprises a frequency generator and a pulse generator, the frequency generator being connected to the shaft assembly to be rotated therewith, and the pulse generator being adapted to sense, in a contactless manner, rotation of the frequency generator and to emit pulses in relation thereto, the first and second metering means being arranged adjacent to one another, the frequency generators of the metering means being mounted in the respective metering casings, and the two pulse generators being arranged in a separate pulse generator module and disposed in a pulse generator casing which is detachably connected to said metering casings.

2. The apparatus as claimed in claim 1, wherein the frequency generators of the metering means are encompassed in a measuring chamber, through which fluid flows, in the respective metering casings.

3. The apparatus as claimed in claim 1 or 2, wherein the pulse generator module comprises a processor unit which is common to both pulse generators.

4. The apparatus as claimed in claim 1 or 2, wherein the frequency generators comprise magnets, which, as the frequency generators rotate, cause magnetic field changes, and wherein the pulse generators are adapted to convert magnetic field changes into electric pulses.

5. The apparatus as claimed in claim 1 or 2 further comprising switching means arranged on the outside of the pulse generator casing, one pulse generator being associated with each switching means for switching the pulse generator between different modes.

6. The apparatus as claimed in claim 5, wherein each switching means is adapted to actuate an associated switching unit through the wall of the pulse generator casing without any lead-in formed in the wall.

7. The apparatus as claimed in claim 1 or 2, wherein the pulse generator module comprises a correcting means which is calibratable for each pulse generator belonging to the pulse generator module.

8. The apparatus as claimed in claim 1 or 2, wherein the pulse generator module is a exchangeable unit, in which electronics connected to the metering means are enclosed.

9. The apparatus as claimed in claim 1 or 2, wherein the metering casings of said two metering means are integrated in a common casing.

10. A pulse generator module for a fluid pump unit, the pulse generator comprising a casing for connection to at least two metering means, at least two frequency generators disposed outside the casing, and means disposed in the casing for sensing, simultaneously and in a contactless manner, flow-induced movement of each of the frequency generators, and for emitting electric pulses in response to the movement of the frequency generators.

* * * * *